(12) United States Patent
Yu

(10) Patent No.: US 8,447,119 B2
(45) Date of Patent: May 21, 2013

(54) METHOD AND SYSTEM FOR IMAGE CLASSIFICATION

(75) Inventor: Kai Yu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 384 days.

(21) Appl. No.: 12/818,156

(22) Filed: Jun. 18, 2010

(65) Prior Publication Data

US 2011/0229045 A1    Sep. 22, 2011

Related U.S. Application Data

(60) Provisional application No. 61/314,386, filed on Mar. 16, 2010.

(51) Int. Cl.
  *G06K 9/62* (2006.01)
(52) U.S. Cl.
  USPC ........................................................ 382/224
(58) Field of Classification Search .................. 382/224, 382/231; 707/722, 735, 736, 757
  See application file for complete search history.

(56) References Cited

U.S. PATENT DOCUMENTS

| 2005/0058339 A1* | 3/2005 | Kato et al. ................. 382/159 |
| 2011/0044530 A1* | 2/2011 | Wang et al. ................ 382/154 |

OTHER PUBLICATIONS

Svetlana Lazebnik, et al., Beyond Bags of Features: Spatial Pyramid Matching for Recognizing Natural Scene Categories, IEEE Computer Society Conference on Computer Vision and Pattern Recognition, 2006.
Jianchao Yang,et al., Linear Spatial Pyramid Matching Using Sparse Coding for Image Classification, IEEE Conference on Computer Vision and Pattern Recognition, 2009. CVPR 2009.

* cited by examiner

*Primary Examiner* — Edward Park
(74) *Attorney, Agent, or Firm* — Bao Tran; Joseph Kolodka

(57) ABSTRACT

Methods and systems are disclosed for image classification coding an image by nonlinearly mapping an image descriptor to form a high-dimensional sparse vector; spatially pooling each local region to form an image-level feature vector using a probability kernel incorporating a similarity metric of local descriptors; and classifying the image.

6 Claims, 2 Drawing Sheets

METHOD AND SYSTEM FOR IMAGE CLASSIFICATION

The application claims priority to U.S. Provisional Application Ser. No. 61/314,386 filed Mar. 16, 2010, the content of which is incorporated by reference.

BACKGROUND

The invention relates to method and system for image classification.

Image classification, including object recognition and scene classification, remains to be a major challenge to the computer vision community. Perhaps one of the most significant developments in the last decade is the application of local features to image classification, including the introduction of "bag-of-visual-words" representation.

One conventional approach applies probabilistic generative models with the objective towards understanding the semantic content of images. Typically those models extend topic models on bag-of-word representation by further considering the spatial information of visual words.

Certain existing approaches apply vector quantization (VQ) coding on local image descriptors, for example SIFT features or SURF features, and then average pooling to obtain the so-called "bag-of-visual-words" representation, which is fed into a nonlinear classifier based on SVMs using Chi-square or intersection kernel.

A further extension is to incorporate the spatial information of local descriptors in an image, by partition images into regions in different locations and scales and compute region-based histograms, instead of computing the global histogram for the entire image. These region-based histograms are concatenated to form the feature vector for the image. Then nonlinear SVM is applied for classification. This approach is called "spatial pyramid matching kernel" (SPMK) method. SPMK is regarded the state-of-the-art method for image classification.

It is known that SVMs use pyramid matching kernels, biologically-inspired models, and KNN methods. Over the past years, the nonlinear SVM method using spatial pyramid matching (SPM) kernels seems to be dominant among the top performers in various image classification benchmarks, including Caltech-101, PASCAL, and TRECVID. The recent improvements were often achieved by combining different types of local descriptors, without any fundamental change of the underlying classification method. In addition to the demand for more accurate classifiers, one has to develop more practical methods. Nonlinear SVMs scale at least quadratically to the size of training data, which makes it nontrivial to handle large-scale training data. It is thus necessary to design algorithms that are computationally more efficient.

SUMMARY

In one aspect, methods and systems are disclosed for image classification coding an image by nonlinearly mapping an image descriptor to form a high-dimensional sparse vector; spatially pooling each local region to form an image-level feature vector using a probability kernel incorporating a similarity metric of local descriptors; and classifying the image.

In another aspect, a method for image classification includes nonlinearly mapping one or more descriptors of an image to form a high-dimensional sparse vector using Super-Vector nonlinear coding; spatial pooling each local region by aggregating codes of the descriptors in each local region to form a single vector, and concatenating vectors of different regions to form the image-level feature vector using probability kernel incorporating the similarity metric of local descriptors; and image classifying by normalizing image-level feature vector using linear SVMs.

In a related aspect, a system for image classification includes means for coding descriptor of an image by nonlinearly mapping to form a high-dimensional sparse vector using Super-Vector nonlinear coding method; means for spatial pooling each local region by aggregating the codes of all the descriptors in each local region to form a single vector, and concatenating vectors of different regions to form the image-level feature vector using probability kernel incorporating the similarity metric of local descriptors; and means for image classifying by normalizing image-level feature vector using linear SVMs.

In yet another aspect, a method for image classification includes extracting local image descriptors from a grid of locations in an image; nonlinearly coding extracted image descriptors to form a high-dimensional sparse vector; spatial pooling each image by partitioning into regions in different scales and locations, aggregating the codes of the descriptors in each region to form a single vector, and concatenating vectors of different regions to form the image-level feature vector; and linear classifying image-level feature vector.

In another related aspect, the system for image classification includes means for extracting local image descriptors from a grid of locations in an image; means for nonlinearly coding extracted image descriptors to form a high-dimensional sparse vector; means for spatial pooling each image by partitioning into regions in different scales and locations, aggregating the codes of all the descriptors in each region to form a single vector, means for concatenating vectors of different regions to form the image-level feature vector; and means for linear classifying image-level feature vector.

Advantages of the preferred embodiments may include one or more of the following. Image classification can be done using local visual descriptors. The system is more scalable in computation, transparent in classification, and greater accuracy than conventional systems. The overall image classification framework enjoys a linear training complexity, and also a great interpretability that is missing from conventional systems.

DESCRIPTION

Figure 1:
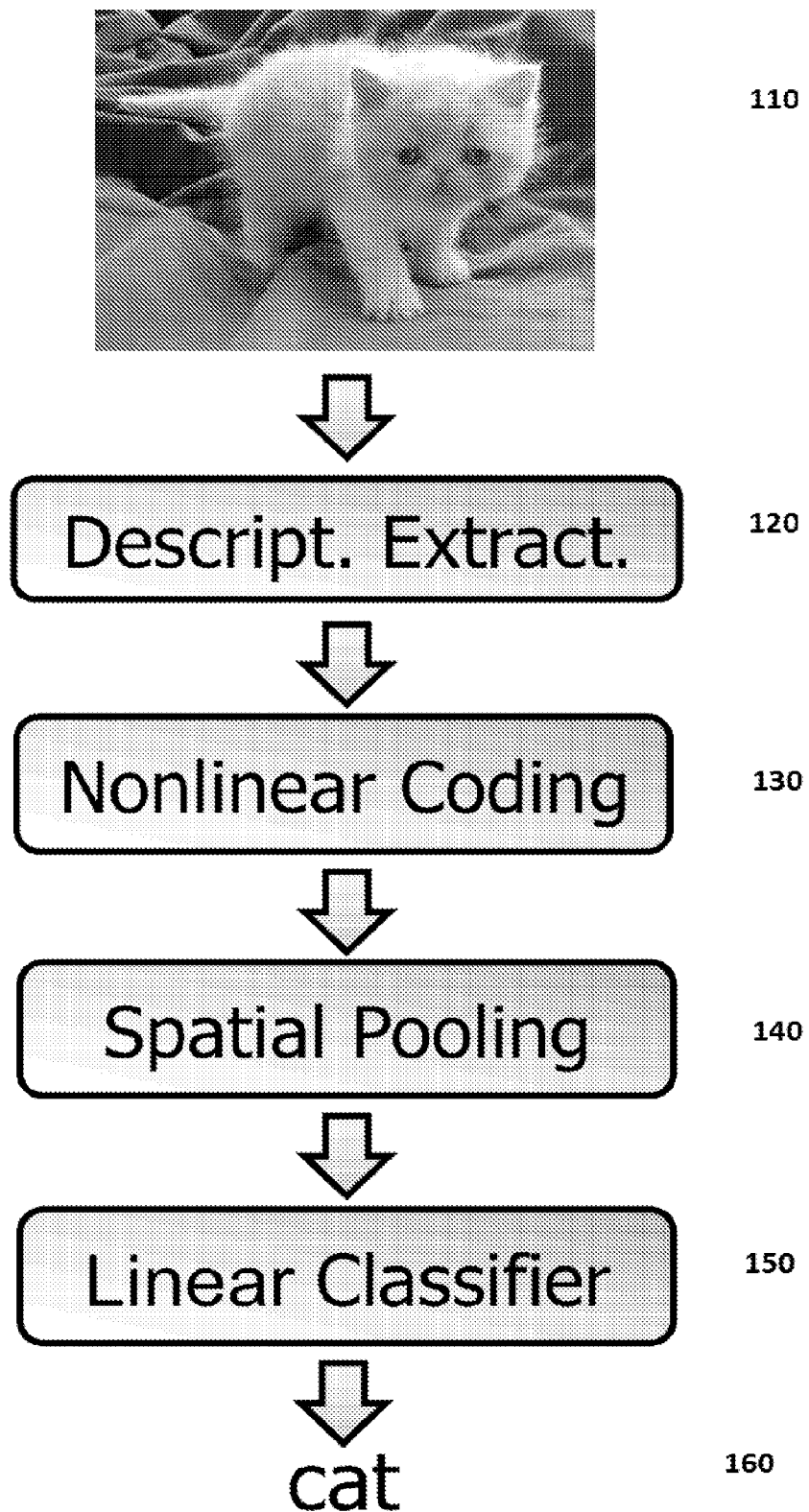
FIG. 1 is a flow chart showing image classification method.

FIG. 1 is a flow chart showing image classification method. As shown in FIG. 1, the method receives an input image in 110. Next, the method performs a descriptor extraction in 120. This operation extracts local image descriptors, such as SIFT, SURF, or any other local features, from a grid of locations in the image. As a result, the image is represented as a set of descriptor vectors with their 2D location coordinates. Next, the method performs nonlinear coding in 130. Each descriptor of an image is nonlinearly mapped to form a high-dimensional sparse vector. The invention propose a novel nonlinear coding method called Super-Vector (SV) coding, which enjoys better theoretical properties than Vector Quantization (VQ) coding. Next, in 140, the method performs spatial pooling where each image is partitioned into regions in different scales and locations. For each region, the codes of all the descriptors in it are aggregated to form a single vector, then vectors of different regions are concatenated to form the image-level feature vector. A probability kernel incorporating the similarity metric of local descriptors can be used in one embodiment as described in detail below. Next, the process performs linear classification in 150. The image-level feature vector is normalized and fed into a classifier to detect an object such as a cat in 160. Linear SVMs, which scale linearly to the size of training data, are used in the method. In contrast, the previous state-of-the-art systems used nonlinear SVMs which requires quadratic or higher-order computational complexity for training.

Next, one embodiment of the descriptor coding is described. In this embodiment, the coding method enjoys appealing theoretical properties. It is interested in learning a smooth nonlinear function $f(x)$ defined on a high dimensional space $R^d$. The question is, how to derive a good coding scheme (or nonlinear mapping) $\phi(x)$ such that $f(x)$ can be well approximated by a linear function on it, namely $w^T\phi(x)$. Assumption here is that $f(x)$ should be sufficiently smooth.

In a general unsupervised learning setting, where a set of bases $C \subset R^d$, called codebook or dictionary, is employed to approximate any x, namely, $$x \approx \sum_{v \in C} \gamma_v(x) v,$$

where $\gamma(x) = [\gamma_v(x)]_{v \in C}$ is the coefficients, and sometimes $\Sigma_v \gamma_v(x) = 1$. By restricting the cardinality of nonzeros of $\gamma(x)$ to be 1 and $\gamma_v(x) \geq 0$, the Vector Quantization (VQ) method is obtained as:

$$v_*(x) = \underset{v \in C}{\operatorname{argmin}} \|x - v\|,$$

where P·P is the Euclidean norm (2-norm). The VQ method uses the coding $\gamma_v(x)=1$ if $v=v_*(x)$ and $\gamma_v(x)=0$ otherwise. $f(x)$ is $\beta$ Lipschitz derivative smooth if for all $x, x' \in R^d$:

$$|f(x) - f(x') - \nabla f(x')^T(x-x')| \leq \frac{\beta}{2}\|x-x'\|^2.$$

It immediately implies the following simple function approximation bound via VQ coding: for all $x \in R^d$:

$$|f(x) - f(v_*(x)) - \nabla f(v_*(x))^T(x - v_*(x))| \leq \frac{\beta}{2}\|x - v_*(x)\|^2. \quad (1)$$

This bounds simply states that one can approximate $f(x)$ by $f(v_*(x)) + \nabla f(v_*(x))^T(x - v_*(x))$, and the approximation error is upper bounded by the quality of VQ. It further suggests that the function approximation can be improved by learning the codebook C to minimize this upper bound. One way is the K-means algorithm $$C = \underset{C}{\operatorname{argmin}} \left\{ \sum_x \min_{v \in C} \|x - v\|^2 \right\}.$$

Eq. (1) also suggests that the approximation to $f(x)$ can be expressed as a linear function on a nonlinear coding scheme $$f(x) \approx g(x) = w^T \phi(x),$$

where $\phi(x)$ is called the Super-Vector (SV) coding of x, defined by $$\phi(x) = [s\gamma_v(x), \gamma_v(x)(x-v)^T]_{v \in C}^T \quad (2)$$

where s is a nonnegative constant. It is not difficult to see that $$w = \left[\frac{1}{s}f(v), \nabla f(v)\right]_{v \in C},$$

which can be regarded as unknown parameters to be estimated. Because $\gamma_v(x)=1$ if $v=v_*(x)$, otherwise $\gamma_v(x)=0$, the obtained $\phi(x)$ a is highly sparse representation, with dimensionality $|C|(d+1)$. For example, if $|C|=3$ and $\gamma(x)=[0,1,0]$, then $$\phi(x) = \left[\underbrace{0, \ldots, 0}_{d+1 \text{ dim.}}, \underbrace{s, (x-v)^T}_{d+1 \text{ dim.}}, \underbrace{0, \ldots, 0}_{d+1 \text{ dim.}}\right]^T \quad (3)$$

$w^T\phi(x)$ provides a piece-wise linear function to approximate a nonlinear function $f(x)$, while with VQ coding $\phi(x) = [\gamma_v(x)]_{v \in C}^T$, the same formulation $w^T\phi(x)$ gives a piece-wise constant approximation. SV coding may achieve a lower function approximation error than VQ coding. It should be noted that the popular bag-of-features image classification method essentially employs VQ to obtain histogram representations. The proposed SV coding is a simple extension of VQ, and may lead to a better approach to image classification.

Next, one embodiment of spatial pooling is discussed. Each image can be represented as a set of descriptor vectors x that follows an image-specific distribution, represented as a probability density function p(x) with respect to an image independent back-ground measure $d\mu(x)$. Let's first ignore the spacial locations of x, and address the spacial pooling later. A kernel-based method for image classification is based on a kernel on the probability distributions over $x \in \Omega$, $K: P \times P \mapsto R$. A well-known example is the Bhattacharyya kernel:

$$K_b(p, q) = \int_\Omega p(x)^{\frac{1}{2}} q(x)^{\frac{1}{2}} d\mu(x).$$

Here p(x) and q(x) represent two images as distributions over local descriptor vectors, and $\mu(x)$ is the image independent background measure. Bhattacharyya kernel is closely associated with Hellinger distance, defined as $D_h(p,q) = 2 - K_b(p,q)$, which can be seen as a principled symmetric approximation of the Kullback Leibler (KL) divergence. Despite the popular application of both Bhattacharyya kernel and KL divergence, a significant drawback is the ignorance of the underlying similarity metric of x. In order to avoid this problem, one has to work with very smooth distribution families that are inconvenient to work with in practice. This invention propose a novel formulation that explicitly takes the similarity of x into account:

$$K_s(p, q) = \int_\Omega \int_\Omega p(x)^{\frac{1}{2}} q(x')^{\frac{1}{2}} \kappa(x, x') d\mu(x) d\mu(x')$$

-continued $$= \int_\Omega \int_\Omega p(x)^{-\frac{1}{2}} q(x')^{-\frac{1}{2}} \kappa(x, x') p(x) q(x') d\mu(x) d\mu(x')$$

where K(x,x') is a RKHS kernel on Q that reflects the similarity structure of x. In the extreme case where K(x,x')=δ(x−x') is the delta-function with respect to μ(•), then the above kernel reduces to the Bhattacharyya kernel.

The system cannot directly observe p(x) from any image, but a set X of local descriptors. Therefore, based on the empirical approximation to $K_s(p,q)$, a kernel between sets of vectors is defined as:

$$K(X, X') = \frac{1}{NN'} \sum_{x \in X} \sum_{x' \in X'} p(x)^{-\frac{1}{2}} q(x')^{-\frac{1}{2}} \kappa(x, x') \quad (4)$$

where N and N' are the sizes of the descriptor sets from two images.

If κ(x,x')=(φ(x),φ(x')), where φ(x) is the SV coding defined in the previous section. It is easy to see that κ(x,x')=0 if x and x' fall into different clusters. Then Eq. (4) is presented as follows:

$$K(X, X') = \frac{1}{NN'} \sum_{k=1}^{|C|} \sum_{x \in X_k} \sum_{x' \in X'_k} p(x)^{-\frac{1}{2}} q(x')^{-\frac{1}{2}} \kappa(x, x')$$

where $X_k$ is the subset of X fallen into the k-th cluster. Furthermore, assume that p(x) remains constant within each cluster partition, i.e., p(x) gives rise to a histogram $[p_k]_{k=1}^{|C|}$, then $$K(X, X') = \frac{1}{NN'} \sum_{k=1}^{|C|} \left\langle \frac{1}{\sqrt{p_k}} \sum_{x \in X_k} \phi(x), \frac{1}{\sqrt{q_k}} \sum_{x' \in X'_k} \phi(x') \right\rangle$$

The above kernel can be re-written as an inner product kernel of the form K(X,X')=(Φ(X),Φ(X')), where $$\Phi(X) = \frac{1}{N} \sum_{k=1}^{|C|} \frac{1}{\sqrt{p_k}} \sum_{x \in X_k} \phi(x).$$

Therefore functions in the reproducing kernel Hilbert space for this kernel has a linear representation $f(X)=w^T \Phi(X)$. In other words, Φ(X) can be used simply as nonlinear feature vector and then a linear classifier is learned using this feature vector. The effect is equivalent to using nonlinear kernel K(X,X') between image pairs X and X'.

Finally, weighting by histogram $p_k$ is equivalent to treating density p(x) as piece-wise constant around each VQ basis, under a specific choice of background measure μ(x) that equalizes different partitions. This representation is not sensitive to the choice of background measure μ(x), which is image independent. In particular, a change of measure μ(•) (still piece-wise constant in each partition) leads to a rescaling of different components in Φ(X). This means that the space of linear classifier $f(X)=w^T \Phi(X)$ remains the same.

To incorporate the spatial location information of x, the idea of spatial pyramid matching is applied. Let each image be evenly partitioned into 1×1, 2×2, and 3×1 blocks, respectively in 3 different levels. Based on which block each descriptor comes from, the whole set X of an image is then organized into three levels of subsets: $X_{11}^1, X_{11}^2, X_{12}^2, X_{21}^2, X_{22}^2, X_{11}^3, X_{12}^3$, and $X_{13}^3$. Then the pooling operation introduced in the last subsection can be applied to each of the subsets. An image's spatial pyramid representation is then obtained by concatenating the results of local pooling $$\Phi_s(X) = [\Phi(X_{11}^1), \Phi(X_{11}^2), \Phi(X_{12}^2), \Phi(X_{21}^2), \Phi(X_{22}^2), \Phi(X_{11}^3), \Phi(X_{12}^3), \Phi(X_{13}^3)]$$

Next, one embodiment of image classification is described. Image classification is done by applying classifiers based on the image representations obtained from the pooling step. It is required to find whether a particular category of objects is contained in an image or not, which can be translated into a binary classification problem. This is performed by applying a linear SVM that employs a hinge loss to learn $g(X)=w^T \Phi_s(X)$. It should be noted that the function is nonlinear on X since $\Phi_s(X)$ is a nonlinear operator.

The image-level classification function is closely connected to a real-valued function on local descriptors. Without loss of generality, let's assume that only global pooling is used, which means $\Phi_s(X)=\Phi(X)$ in this case.

$$g(X) = w^T \Phi(X) = \frac{1}{N} \sum_{k=1}^{|C|} \frac{1}{\sqrt{p_k}} \sum_{x \in X_k} w^T \phi(x) = \frac{1}{N} \sum_{k=1}^{|C|} \frac{1}{\sqrt{p_k}} \sum_{x \in X_k} g(x) \quad (5)$$

where $g(x)=w^T \phi(x)$. The above equation provides an interesting insight to the classification process: a patch-level pattern matching is operated everywhere in the image, and the responses are then aggregated together to generate the score indicating how likely a particular category of objects is present. This observation is well-aligned with the biologically-inspired vision models, like Convolution Neural Networks and HMAX model, which mostly employ feed-forward pattern matching for object recognition.

This connection stresses the importance of learning a good coding scheme on local descriptors x, because Φ(x) solely defines the function space of $g(x)=w^T \Phi(x)$, which consequently determines if the unknown classification function can be well learned. The connection also implies that supervised training of Φ(x) could potentially lead to further improvements.

Furthermore, the classification model enjoys the advantages of interpretability and computational scalability. Once the model is trained, Eq. (5) suggests that one can compute a response map based on g(x), which visualizes where the classifier focuses on in the image. Since the proposed method naturally requires a linear classifier, it enjoys a training scalability which is linear to the number of training images, while nonlinear kernel-based methods suffer quadratic or higher complexity.

The classification model is more related to local coordinate coding (LCC), which points out that in some cases a desired sparsity of φ(x) should come from a locality of the coding scheme. Indeed, the proposed SV coding leads to a highly sparse representation φ(x), as defined by Eq. (2), which activates those coordinates associated to the neighborhood of x. As the result, $g(x)=w^T \phi(x)$ gives rise to a local linear function (i.e., piece-wise linear) to approximate the unknown nonlinear function f(x). But, the computation of SV coding is much simpler than sparse coding approaches.

The method can be further improved by considering a soft assignment of x to bases C. The underlying interpretation of $f(x) \approx w^T \phi(x)$ is the approximation $$f(x) \approx f(v_*(x)) + \nabla f(v_*(x))^T (x - v_*(x))$$

which essentially uses the unknown function's Taylor expansion at a nearby location $v_*(x)$ to interpolate $f(x)$. One natural idea to improve this is using several neighbors in C instead of the nearest one. Let's consider a soft K-means that computes $p_k(x)$, the posterior probability of cluster assignment for x. Then the function approximation can be handled as the expectation $$f(x) \approx \sum_{k=1}^{|C|} p_k(x)[f(v_k) + \nabla f(v_k)^T (x - v_k)]$$

Then the pooling step becomes a computation of the expectation $$\Phi(X) = \frac{1}{N} \left[ \frac{1}{\sqrt{p_k}} \sum_{x \in X} p_k(x)(x - v_k + s) \right]_{k=1}^{|C|}$$

where $$p_k = \frac{1}{N} \sum_{x \in X} p_k(x),$$

and s comes from Eq. (2). This approach is different from the image classification using GMM. Basically, those GMM methods consider the distribution kernel, while the inventive method incorporates nonlinear coding into the distribution kernel. Furthermore, the model according to the invention requires the stickiness to VQ—the soft version requires all the components share the same isotropic diagonal covariance. That means a much less number of parameters to estimate, and therefore a significantly higher accuracy can be obtained.

As suggested by Eq. 5, a very unique perspective of this method is the "transparency" of the classification model. Once the image classifier is trained, a real-valued function g(x) is automatically obtained on the local descriptor level. Therefore a response map of g(x) can be visualized on test images.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 2:
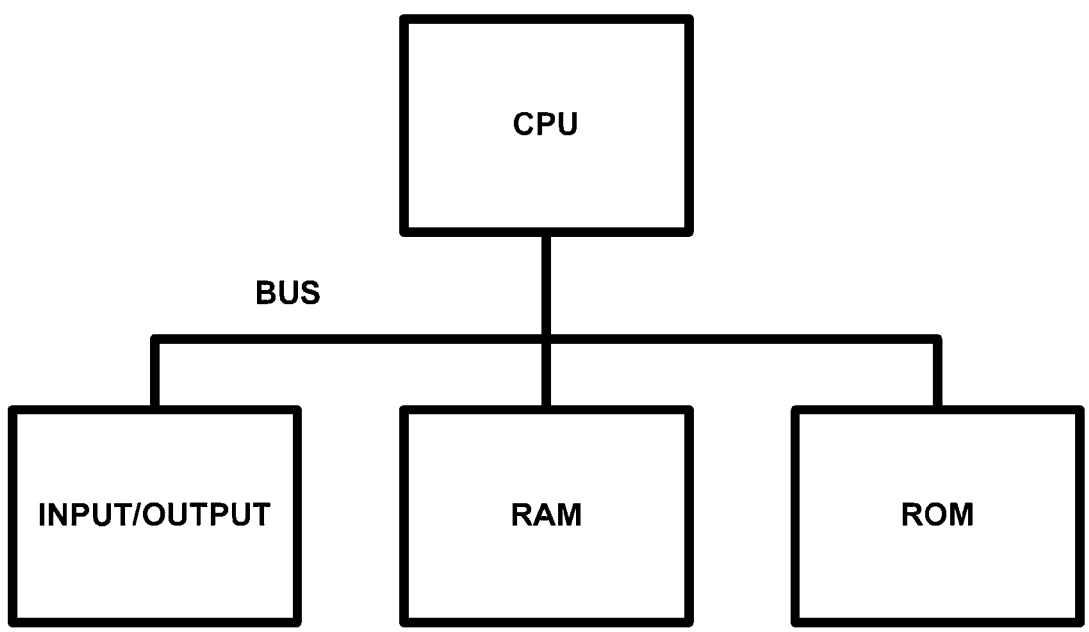
FIG. 2 shows an exemplary system to perform image classification.

By way of example, a block diagram of a computer to support the system is shown in FIG. 2. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

The system of FIG. 2 receives images to be classified. Each image is represented by a set of local descriptors with their spatial coordinates. The descriptor can be SIFT, or any other local features, computed from image patches at locations on a 2D grid. In one embodiment, the images is processed by a descriptor coding module where each descriptor of an image is nonlinearly mapped to form a high-dimensional sparse vector. A nonlinear coding method called vector machine coding can be used, which is an extension of Vector Quantization (VQ) coding. Next, the descriptor are provided to a spatial pooling module. For each local region, the codes of all the descriptors in it are aggregated to form a single vector, then vectors of different regions are concatenated to form the image-level feature vector. This step is based on a novel probability kernel incorporating the similarity metric of local descriptors. The image-level feature vector is normalized and fed into a classifier. Linear SVMs, which scale linearly to the size of training data, is used in this step.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A computer-implemented method for image classification, comprising:
   a. coding an image by nonlinearly mapping an image descriptor to form a high-dimensional sparse vector;
   b. spatially pooling each local region to form an image-level feature vector using a probability kernel incorporating a similarity metric of local descriptors; and
   c. classifying the image;

wherein the nonlinear mapping of f(x) is approximated by a linear function $w^T \phi(x)$, where $\phi(x)$ is called the Super-Vector (SV) coding of x, defined by $$\phi(x) = [s\gamma_v(x), \gamma_v(x)(x-v)^T]_{v \in C}^T,$$

and wherein the spatially pooling forms a modified Bhattacharyya kernel.

2. The method of claim 1, comprising representing the image as a set of descriptor vectors with their 2D location coordinates.

3. The method of claim 1, wherein the descriptor comprises one or more local features.

4. The method of claim 1, wherein the pooling comprises, for each local region, aggregating codes of all the descriptors to form a single vector and concatenating vectors of different regions to form an image-level feature vector.

5. The method of claim 1, comprising performing spatial pyramid matching to incorporate spatial location information.

6. The method of claim 1, comprising applying a linear support vector machine (SVM) to classify the image.

* * * * *